United States Patent [19]
Bantz

[11] 3,942,574
[45] Mar. 9, 1976

[54] TIRE BEAD
[75] Inventor: Robert L. Bantz, Cumberland, Md.
[73] Assignee: The Goodyear Tire & Rubber Company, Akron, Ohio
[22] Filed: Dec. 16, 1974
[21] Appl. No.: 533,043

[52] U.S. Cl. .............................. 152/362 R
[51] Int. Cl.² ............................... B600 15/04
[58] Field of Search ................ 152/362 R, 362 CS; 260/32.6; 156/136; 245/1.5

[56] References Cited
UNITED STATES PATENTS
2,053,519  9/1936  Crowley ..................... 152/362 R
3,600,350  8/1971  Kwolek ........................ 260/32.6
3,736,974  6/1973  Jueune ....................... 152/362 R Primary Examiner—Allen N. Knowles
Assistant Examiner—Hadd Lane
Attorney, Agent, or Firm—F. W. Brunner; H. E. Hummer

[57] ABSTRACT

A tire bead consisting of at least two cords of different materials. One of the cords is composed of aramid and the other of the cords is composed of metal for stabilizing the aramid cords and rigidifying the beads.

7 Claims, 1 Drawing Figure

U.S. Patent   March 9, 1976   3,942,574
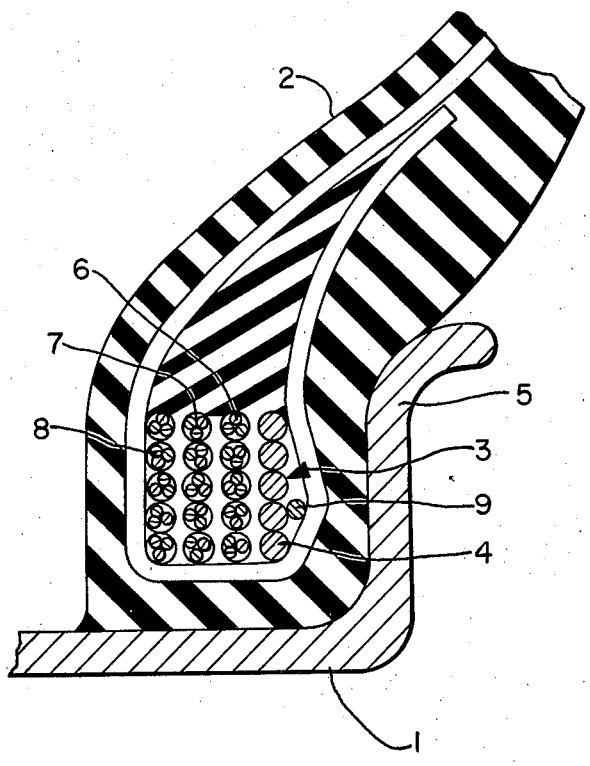

TIRE BEAD

BACKGROUND OF THE INVENTION

The invention is an improvement in the tire bead described in copending application Ser. No. 389,110, filed Aug. 17, 1973.

The beads of this application are described in connection with a bias-belted tire composed of conventional components of an innerliner, carcass plies, belt structure, tread and sidewalls. The beads are each formed from cords composed of aramid which is a manufactured organic fiber in which the fiber-forming substance is a long chain synthetic aromatic polyamide in which at least 85 percent of the amide linkages are attached directly to two aromatic rings. Further, the polyamides contain at least 85 mol percent units having the formula:

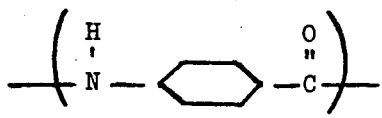

Polyamides of this type can be prepared in accordance with the procedures outlined in French Pat. No. 1,526,745. Cords of aramid, suitable for use in a tire bead, are treated with an appropriate adhesive for promoting the bond between the cord and rubbery material used in the production of the tire. These cords are also treated under controlled conditions of time, temperature, and tension to optimize the physical characteristics of the cord which, when fully treated, has a modulus of elasticity of at least 300 grams per denier.

One or more beads of aramid can be utilized in each tire, depending on whether the tire is made for a passenger vehicle, truck, or aircraft. Aramid makes a good bead material. However, tire beads composed solely of aramid fibers or cords are extremely difficult to handle and build into a tire because of their limpness. The invention is directed to stabilizing, or stiffening a tire bead which is chiefly composed of aramid fibers or cords.

It has been found that one or more metal cords has a highly rigidifying effect on tire beads formed of aramid cords or fibers. The metal cord can be in the form of a single, high-strength, steel ring which is secured to the aramid cords by a spiral wrapping of another aramid cord. It has been found easier, from a production standpoint, positioning the aramid cords against a coiled metal cord. Such a composite tire bead of aramid and metal is best seen in the accompanying drawing which is a section of a wheel rim 1 and tire 2 in the area of the bead 3 which is embedded in the tire 2 such that the coiled metal cord 4 will be closest the upstanding flange 5 of the wheel rim 1 on which the tire 2 is mounted. The bead 3 was made by using three aramid cords 6–8 of 333/3 construction and one metal cord 4 of 0.048 inch steel wire, the wire cord 4 being coiled and alongside the three aramid cords 6–8 which are also disposed in coiled side-by-side relation. A spiral wrapping 9 is also employed for holding the metal and aramid cords together.

Thus, there has been described an improved tire bead composed mainly of aramid fibers or cords. The use of at least one wire cord stabilizes the aramid cords and stiffens or rigidifies the bead, such that it can be readily handled and positioned for placement in a tire.

What is claimed is:

1. A tire bead consisting of a plurality of cords composed of aramid fibers and a single cord composed of metal for stiffening the bead.

2. The tire bead of claim 1, wherein the metal cord is a single, wire ring.

3. The tire bead of claim 1, wherein the metal cord is a spirally wrapped metal cord.

4. The tire bead of claim 3, wherein the metal cord is disposed at the side of the bead closest the upstanding flange of a wheel rim when the tire bead is mounted on the rim.

5. The tire bead of claim 1, wherein the bead is composed mainly of aramid cords.

6. The tire bead of claim 5, wherein the aramid cords, when treated with an adhesive and fully processed for use in a tire bead, each have a modulus of elasticity of at least 300 grams per denier.

7. The tire bead of claim 1, used in conjunction with at least one like tire bead in the formation of an aircraft tire.

* * * * *